United States Patent [19]

Cartoni

[11] Patent Number: 4,899,854
[45] Date of Patent: Feb. 13, 1990

[54] MODULAR ELEMENT AS A COMPONENT OF A DAMPING MEMBER FOR SUPPORT HEADS OF MOTION-PICTURE OR TELEVISION CAMERAS IN PROFESSIONAL CINEMATOGRAPHY AND TELEVISION

[76] Inventor: Guido Cartoni, No. 31, Via Michele di Lando, 00162 Roma, Italy

[21] Appl. No.: 253,647

[22] Filed: Oct. 5, 1988

[30] Foreign Application Priority Data

Jun. 6, 1988 [IT] Italy .............................. 48056 A/88

[51] Int. Cl.4 .......................................... F16F 15/20
[52] U.S. Cl. ..................................... 188/290; 74/574; 188/268
[58] Field of Search .................. 74/574; 188/268, 290, 188/322.5; 267/113, 136, 140.1

[56] References Cited

U.S. PATENT DOCUMENTS

| | | | |
|---|---|---|---|
| 2,838,955 | 6/1958 | Burch | 74/574 |
| 3,362,510 | 1/1968 | Nash | 188/290 |
| 3,861,503 | 1/1975 | Nash | 188/290 X |
| 3,907,079 | 9/1975 | Chapman | 188/290 |
| 4,694,530 | 9/1987 | Foggini | 188/290 X |

Primary Examiner—Duane A. Reger
Attorney, Agent, or Firm—Pollock, Vande Sande & Priddy

[57] ABSTRACT

A modular element as a component of a damping member for support heads of motion picture or television cameras. The element includes a first annular portion that can be made integral with the rotor, and a second annular portion complementary to the first and that can be made integral with the stator of the support head. The first annular portion has on its inside surface a series of continuous concentric overhanging surfaces alternating with a series of complementary cavities, and the second annular portion has on its inside surface a series of continuous concentric overhanging surfaces as well as a a series of cavities complementary to such surfaces. The overhanging surfaces of the first and second portions engage respectively with the cavities alternating in a comb-like arrangement, and a continuous hollow space is provided between the two series of cavities and the two series of surfaces for the circulation of damping fluid.

9 Claims, 3 Drawing Sheets

MODULAR ELEMENT AS A COMPONENT OF A DAMPING MEMBER FOR SUPPORT HEADS OF MOTION-PICTURE OR TELEVISION CAMERAS IN PROFESSIONAL CINEMATOGRAPHY AND TELEVISION

FIELD OF THE INVENTION

Disclosure of the Invention

The present invention relates to a modular element as a component of a damping member for support heads of motion-picture or television cameras used in professional cinematography and television.

More particularly, the invention relates to a modular element as a component of a damping member provided in the heads of articulated supports which allow both horizontal and azimuthal panning shots.

Such supports can move freely, or their motion can be controlled by various means so as to obtain angular shifts free of vibrations and discontinuities.

BACKGROUND OF THE INVENTION

A number of supports for motion-picture or television cameras are known from motion-picture and television technologies, such supports having fluid-operated special heads that allow both horizontal and vertical motions to be obtained with continuity and without vibrations, and that are able to give rise to resistance forces variable according to the type and the sizes of the camera employed.

It is already well known how to obtain damping members for fluid-operated heads through the employment of friction disks of different materials, such disks being dry or lubricated, and being pressed against one another so as to give rise to a force resisting the motion.

Moreover, the adjustment effect of the angular shifts can be obtained through a system of flywheels which are driven through rolling friction, so that both a constant force resisting the motion and a positive or a negative velocity gradient are simulataneously obtained.

A further technological development of such systems occurred with the introduction of heads for application to supports for motion-picture or television cameras that employed quite a different damping principle with respect to the preceding supports.

Such a system adopted by O'Connor and disclosed in a number of patents and so developed as to be best adaptable to employment with motion-picture and television cameras, essentially consists in causing a surface to move with respect to another surface with the interposition of a high density grease capable of giving rise to a force resisting the motion and having the characteristics of continuity, as well as of absence of vibrations and noise.

One such system may consist of a cylindrical cavity containing a rotary cylinder with the interposition of a silicone grease.

In order to obtain resisting forces variable during operation while keeping the constraint of giving rise to angular shifts at various speeds. O'Connor introduced the system consisting of a steel band adhering to a metal cylinder covered with a cork lamina with interposition of a silicone oil so that variable resistance forces were obtainable by varying the pressure of the steel band.

A further development in the technology of fluid-operated heads consists in the production of variable resistance forces through the adoption of a device, similar to a brake, which comprises two shoes coated with cork within a silicone oil bath that give rise to variable resistance forces through expansion within the cylinder.

The employment of a special head is also known from a further development of techniques concerning said fluid-operated heads, such special head comprising two series of disks submerged in a silicone fluid bath in which the first series of disks, which is kept locked with respect to the second series, the latter engaging with the first series in a comb-like way, gives rise to resistance forces that are variable as a function of the number of disks in question.

This type of damping member operating on disks submerged in a silicone fluid bath in which the change in the magnitude of the damping force is obtained by locking pairs of disks in a proportional way, has the drawback of requiring a remarkable amount of fluid to warrant the total immersion of all parts and a corresponding employment of the fluid itself.

Moreover, the fact that both the disks and the locking systems for selecting the modules are submerged in the silicone fluid bath makes the maintenance operations difficult to perform.

Finally, a further drawback which is connected to the particular structure of the damping member is that the adjustments of the magnitude of the vertical and the horizontal motions are limited to a predetermined number of positions.

In order to overcome such drawbacks, it has been suggested that the damping member be provided with a series of modules of different powers in which a proportional number of action and reaction disks is grouped, such disks operating in different possible combinations in order to give rise to different resistance forces.

This type of modular device applied both to the vertical and to the horizontal shifts as disclosed in the German Patent No. 2,657,692, consists essentially of a module provided with two series of disks which can be connected respectively to the shaft and to the stationary portion or the stator of said head, such disks being of outside and inside diameters of such sizes as to become reciprocally engaged in a comb-like way and being closed at their ends by plates of a greater thickness, wherein the seal against the leak of the silicone grease is obtained by exerting an axial compression on the two sets of disks and by means of clamping devices arranged along the circumference.

The damping effect in such modules is obtained as a result of friction forces between the different surfaces of the disks with the interposition of grease, such friction forces being thus distributed over the whole surface of the disks of the first and of the second set.

One of the major drawbacks connected to such a construction of the modular damping members consists essentially in the structural complexity of the members themselves, as well as in the need for different materials to be used for the various component members, and in the particularly lengthy assembling operation, not to mention the significant increase in the cost of manufacture.

Accordingly, it is quite clear that there is a need for a modular-element damping member for fluid-operated heads that overcomes the drawbacks arising from the construction and assembly of conventional members, through the reduction of the number of materials employed, the simplification of the assembling procedure and the employment of a control and adjustment system of the amount of fluid supplied in each modular element.

SUMMARY OF THE INVENTION

In order to satisfy such requirement, to the present invention proposes a damping member for fluid-operated heads that consists of modular elements in which the surfaces subjected to friction forces form, in each module, an integral piece with the outer portions of the modular element itself.

More particularly, the present invention proposes a self-contained modular damping element which is made up of a portion that can be connected to the stationary part or the stator and of a portion that can be connected to the rotary portion or the rotor, in which the resistance force effect is produced by friction forces acting on the side walls of two series of surfaces facing one another, on the inside of each of the two portions.

Accordinbgly, the object of the present invention is a damping member for support heads for tripods, which comprises modular damping elements consisting of a first annular portion that can be made integral with the rotary portion or the rotor, and of a second annular portion complementary to the first portion which can be made integral with the stationary portion or the stator of said damping head. The first annular portion has on its inside surface a series of continuous concentric overhanging surfaces alternating with a series of complementary cavities, while said second annular portion has on its inside surface a series of continuous concentric overhanging surfaces and a series of cavities complementary with said surfaces, said series of continuous concentric overhanging surfaces of said second portion engaging with said series of cavities provided on the inside surface of said first portion, and said series of continuous concentric overhanging surfaces of said first portion engaging with said series of cavities of said second portion, a continuous hollow space being provided between said continuous concentric surfaces and said cavities of the first and the second series for the circulation of the damping fluid, said modular element being closed at one side by means of a cover portion.

Advantageously, according to the invention, said second portion of said modular element has an outer side surface parallel to said overhanging surfaces and projecting with respect to the latter so as to contain the outermost surface of the overhanging concentric surfaces of said first portion and so as to become snap engaged with the outer rim of said cover.

Moreover, according to the present invention, in order to obtain the connection with the portion of the stator of the head of the supporting member, said outer side surface of said second portion has a series of toothlike elements for engagement with corresponding locking means.

According to a preferred embodiment of the present invention, said continuous concentric cavities provided on the inside surface of said first portion of said modular member have in their bottom surfaces through holes for expelling the excess damping fluid.

A further advantage of the the modular damping element according to the present invention consists in that a continuous annular cavity is provided in the outside surface of said first portion of said modular member, which cavity forms a hollow for inner pressure balance together with the corresponding continuous annular cavity provided in the inner surface of said cover member.

In order to assure sealing against the leak of the damping liquid, two ring gaskets are provided in the modular element, respectively at the points corresponding to the outside surface of the connecting portion with the rotary element.

Further, according to the present invention, said cover element of said modular member is snap fastened to the rim of said outer surface of the second portion and is welded to the same.

Finally, said first and said second portion of the modular element according to the present invention are made of a plastic or a metallic material, and preferably of a plastic material such as nylon filled with glass fibers.

BRIEF DESCRIPTION OF THE DRAWINGS

The present invention will now be disclosed for purposes of illustration with reference to the attached drawings, wherein.

DESCRIPTION OF PREFERRED EMBODIMENT

Figure 1:
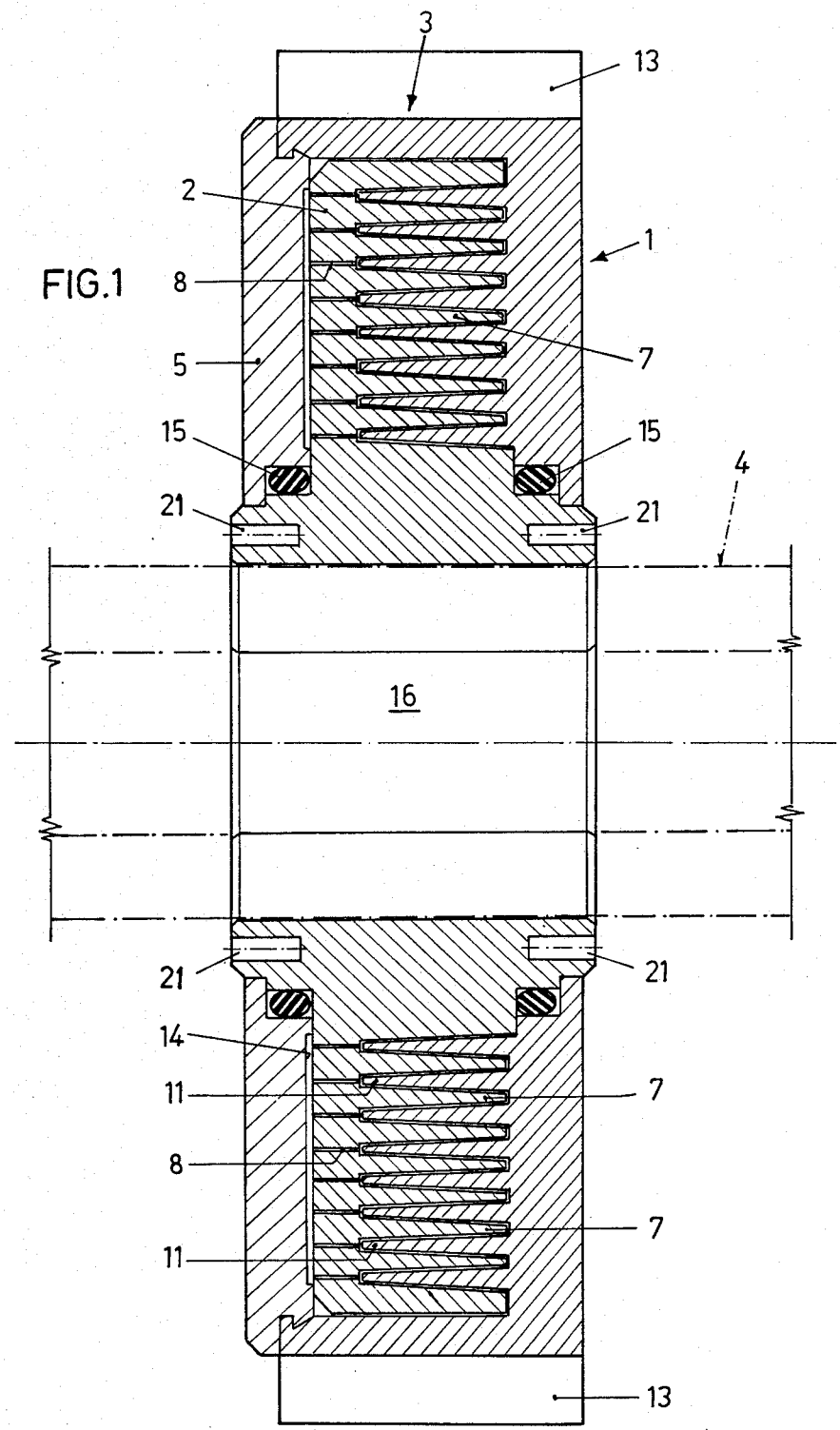
FIG. 1 shows a vertical cross-sectional view of a modular element according to the present invention for damping members.
Figure 2:
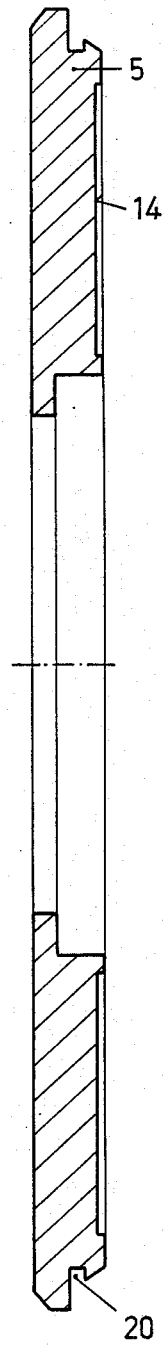
FIG. 2 shows a vertical cross-sectional view of the cover of the modular element according to the present invention.

FIG. 1 shows a modular member 1, suitable for damping members, which is to be inserted into support heads for motion-picture or television cameras, consisting of a first portion 2 keyed to a shaft 4, of a second portion 3 engaging with the fixed portion of the head, and of a cover element 5.

Figure 3:
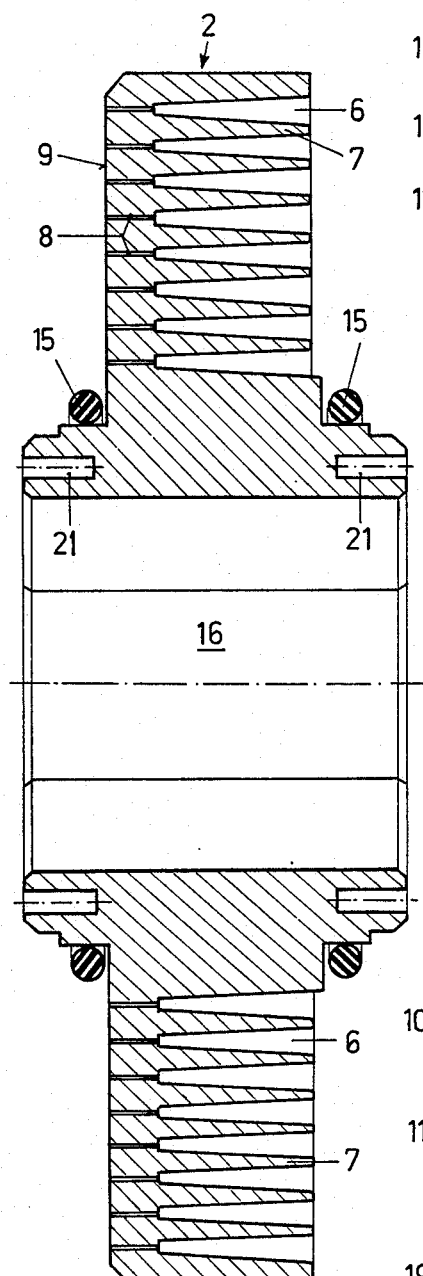
FIG. 3 shows a vertical cross-sectional view of a first portion of the modular element.
Figure 4:
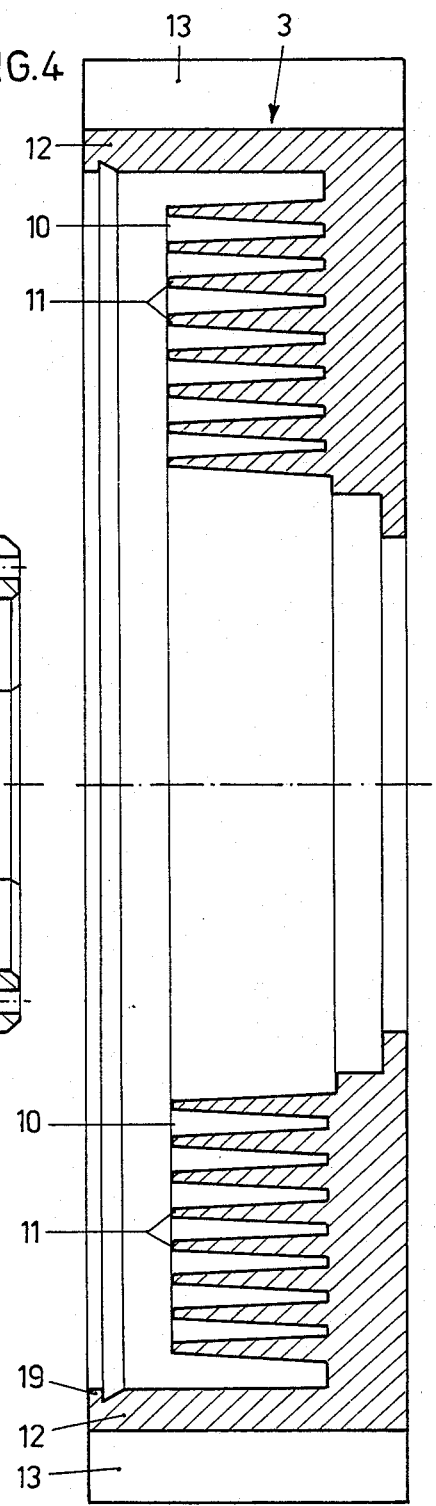
FIG. 4 shows a vertical cross-sectional view of the second portion of the modular element.

Said first portion 2, which is more clearly shown in FIG. 3, consists essentially of an annular element having an outer crown of a thickness less than that of the innermost portion.

A series of concentric, frusto-conical section cavities 6 is provided on the outer portion, such series being obtained through the alternation of concentric annular surfaces 7 having complementary frusto-conical cross sections.

Through holes 8 passing from the bottom portion of the cavity 6 to the outer surface 9 of the element 2 are provided at points randomly distributed along the circumference in the bottom part of each cavity 6.

The innermost part of the annular element 2 of larger cross section is prearranged to be keyed to the shaft 4 so as to become integral with the same.

The concentric surfaces 7 of the portion 2 are so shaped as to engage with the corresponding cavities 10 of the member 3, such surfaces also having frusto-conical sections and alternating with a set of circular concentric surfaces 11.

When the portion 3 is caused to engage with the portion 2, the surfaces 11 of the portion 3 enter the cavity 6 of the portion 2 to depths which depend on the magnitude of the resistance force that one desires to obtain.

The portion 3 of the modular element 1 has a wall 12 at the points corresponding to its outer side surface, such wall being of constant rectangular cross section and projecting with respect to the inside circular surfaces 11 so as to allow the outermost rim to engage with the cover 5 in order to realize the tight seal of the module once the elements 2 and 3 are reciprocally inserted into one another.

The wall 12 of the element 3 has a number of teeth 13 of parallelepipedal section, for the engagement of the modular element with ratchet gear mechanisms provided on the stationary part. Such mechanism (not shown) may comprise a common hooking system for said teeth or a common engagement system for the intermediate cavities, so as to obtain, through the engagement of a variable number of modules, a resistance force effect proportional to the force exerted on the head for horizontal and vertical panning shots with the motion-picture camera mounted on the head of the tripod.

The resistance force effect results from the presence of a damping fluid, e.g., a silicone grease which is injected into the cavity 6 of the member 2 and which, after insertion of the portion 3 into the portion 2 and the consequent engagement of surfaces 11 with the cavities 6, passes into the hollow space provided between the circular adjacent surfaces 7 and 11 of the two modules so as to fill completely such space. Excess grease is pushed through the holes 8 provided in the bottom of the cavities 6 onto the outside surface 9 of the element 2. This surface, together with the complementary surface 14 of the cover 15, forms a kind of space for balancing the inner pressure.

To secure the tight seal of the whole set consisting of the two portions 2 and 3 once they are become engaged with one another, a ring gasket 15 is placed at the point corresponding to the step provided between the annular portion of the element 2 bearing the concentric surfaces and the annular portion of larger cross section of the shaft 4.

Figure 5:
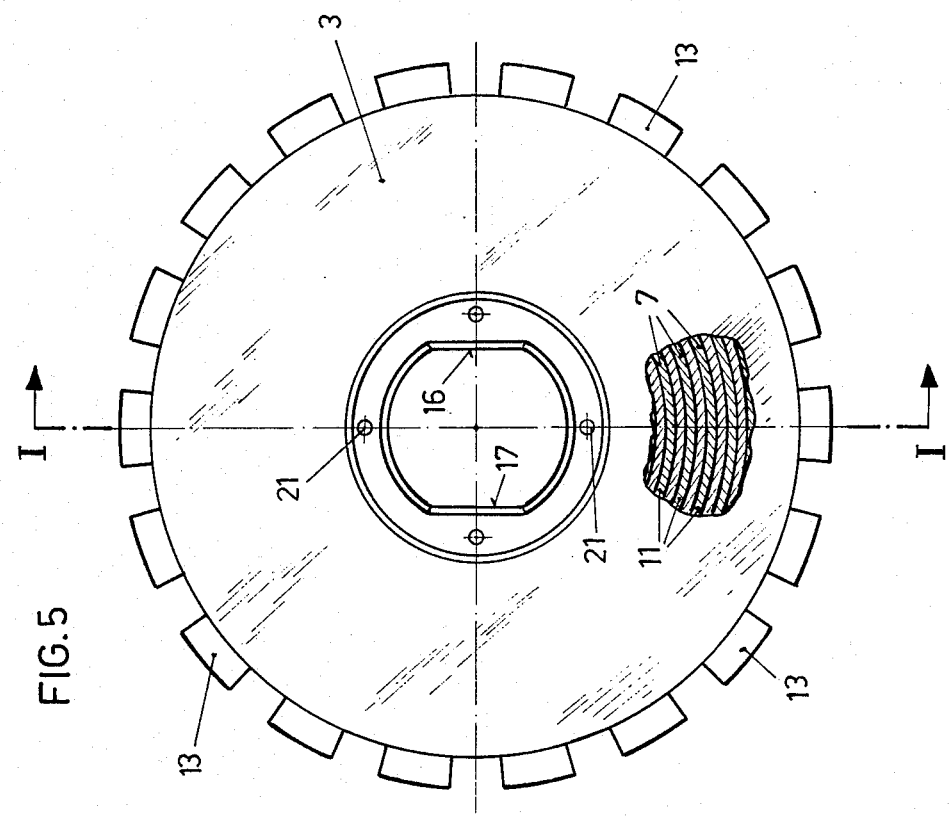
FIG. 5 shows a top plan view of the modular element with a portion of the outside surface partially cut away.

As regards the engagement between the inner surface of the element 2 and the shaft 4, FIG. 5 shows a first embodiment of the connection system having two straight surfaces 16 and 17.

Figure 6:
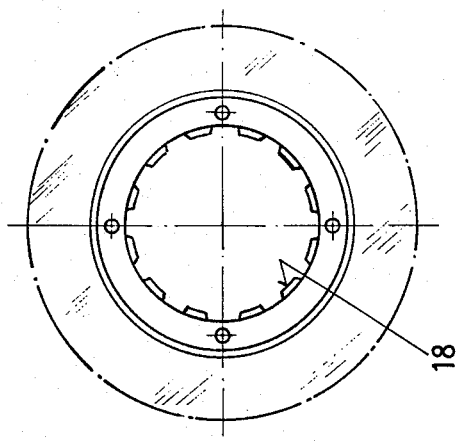
FIG. 6 shows an alternative embodiment of the modular element according to the present invention.

In a second embodiment, shown in FIG. 6, the inside surface of the central cavity of portion 2 has a series of teeth 18 which engage with the corresponding grooves of the shaft.

The operation of assembling the module 1 thus includes the steps of injecting the damping fluid of the required viscosity into the cavities 6 of the element 2, inserting the element 3 into the element 2 so that the concentric surfaces 7 enter the cavities 6 and so that the damping fluid becomes evenly distributed in the hollow spaces between the same; collecting the excess fluid flowing through the holes 8 provided in the bottoms of the cavities 6; arranging the ring gaskets 15 at the points corresponding to the housings or seats provided on the outer part of the innermost annular portion of the element 2, and then arranging the cover 5 on the outer surface 9 of element 2.

The cover 5 is fastened to the outside surface 12 of the element 3 through mutual engagement of a grooved portion 19 of the outer rim of said surface with a corresponding recess 20 and then the fastening is completed with a seal, e.g., loctite.

To connect two successive modular elements, a number of small pins (not shown) may be inserted into recesses 21 provided at the innermost part of the portion 2.

Such damping unit is then keyed to the shaft, possibly adjacent to other modular elements, in which a different value of the resistance force can be obtained not only through variation of the density of the silicon grease put into the grooves, but also by varying the number of cavities provided in each portion, or by varying the depths of the cavities comprised between the concentric circular surfaces.

I claim:

1. In a damping device for motion picture camera support heads, a modular element comprising
   (a) a first annular portion operatively integral with a rotor means and having an inner surface provided with a plurality of continuous concentric overhanging surfaces alternating with a plurality of complementary cavities;
   (b) a second annular portion complementary with said first annular portion and operatively integral with a stator means of said damping device, said second annular portion having an inner surface provided with a plurality of continuous concentric overhanging surfaces alternating with a plurality of complementary cavities;
   (c) said overhanging surfaces of said second portion engaging with said cavities in the inner surface of said first portion, and said overhanging surfaces of said first portion engaging with said cavities of said second portion;
   (d) a continuous hollow space for the circulation of damping fluid between said overhanging surfaces and said complementary cavities; and
   (e) cover means for said modular element;
   (f) and through holes in a bottom portion of said cavities of said first portion for the passage of excess damping fluid.

2. A modular element according to claim 1, wherein said second portion has an outer lateral surface parallel to said overhanging surfaces and projecting with respect to said surfaces, said outer lateral surface being provided with a continuous peripheral groove for snap engagement with said cover means.

3. A modular element according to claim 2, wherein said outer lateral surface of said second portion is provided with tooth means for engagement with a shaft carrying said rotor means.

4. A modular element according to claim 1, wherein the outer surface of said second portion has an annular recess which, together with a corresponding recess in an inner surface of said cover means, forms a hollow space for balancing inner pressure.

5. A modular element according to claim 1, comprising at least two seal means between said first and said second portions.

6. A modular element according to claim 1, wherein said modular element is made of metal.

7. A modular element according to claim 1, wherein said modular element is made of plastic.

8. A modular element according to claim 1, comprising a continuous weld between said cover means and said lateral surface of said second portion.

9. A modular element according to claim 1, comprising cavities in said second portion for the introduction of pin means to connect adjacent modules.

* * * * *